Sept. 23, 1952     E. G. VANDERLIP ET AL     2,611,344

HELICOPTER ROTOR

Filed June 6, 1946

Inventors
Edward G Vanderlip
Elliot Daland

Patented Sept. 23, 1952

2,611,344

UNITED STATES PATENT OFFICE 2,611,344

HELICOPTER ROTOR

Edward G. Vanderlip, Silver Spring, Md., and Elliot Daland, Wallingford, Pa., assignors, by mesne assignments, to Piasecki Helicopter Corporation, Morton, Pa., a corporation of Pennsylvania Application June 6, 1946, Serial No. 674,892

8 Claims. (Cl. 170—160.25)

This invention relates to improvements in helicopters and more particularly to the construction of rotors therefor. The principal object of this invention is the provision of a rotor blade that may be twisted spanwise to assume optimum spanwise pitch settings for varying flight conditions.

Another object of this invention is to provide a control mechanism capable of changing the spanwise twist of a rotor blade for different flight settings and also to control the angle of incidence of the outer portion of the blade for directional control, without moving the inner portion.

Another object is to lessen the loads on the control system.

Figure 1:
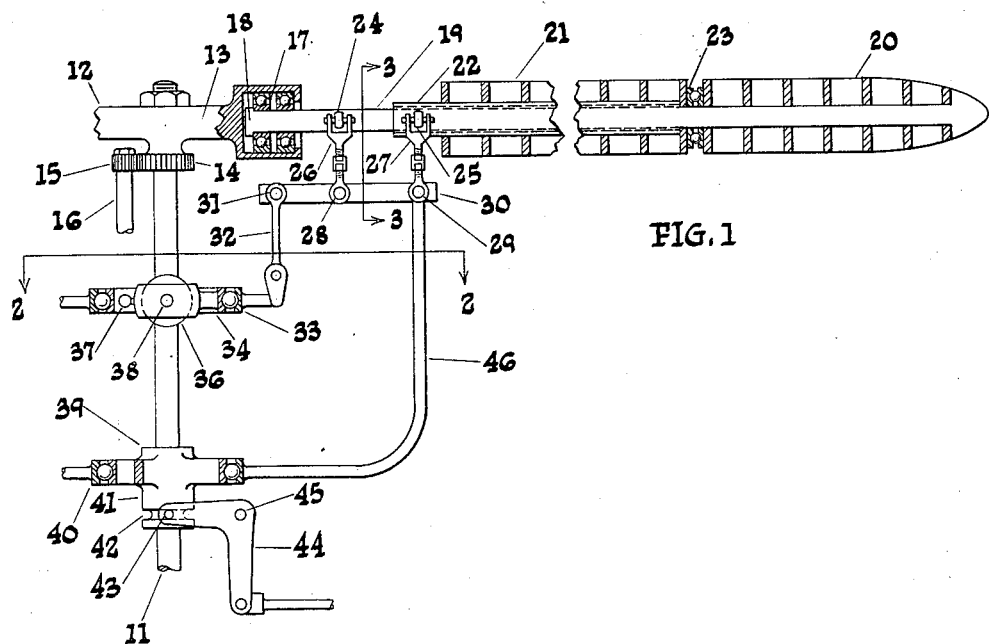
Figures 2, 3:
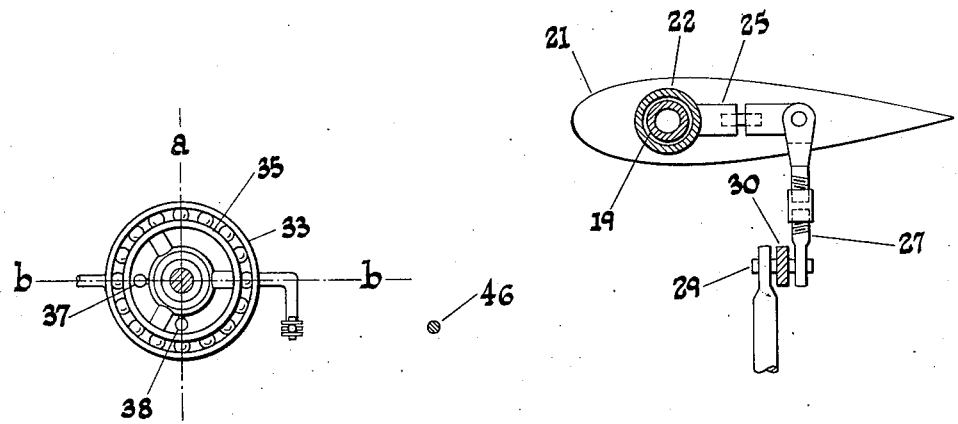

Other objects and advantages of this invention will become apparent as the following specification is read in conjunction with the accompanying drawings. In the drawings, Fig. 1 is an elevation view, shown partly in cross section, of the preferred embodiment of this invention. For purposes of clarity, only one blade of the rotor is shown. Fig. 2 is a view taken on line 2—2 of Fig. 1 showing the cyclic control ring. Fig. 3 is a partial cross section taken on line 3—3 of Fig. 1.

Referring more particularly to the drawing, there is shown a portion of a rotor comprised of a vertical shaft 11 on which is journaled for rotation thereon, a hub 12. The hub 12 is made up of two or more radial arms 13 depending on the number of blades desired in the rotor. Fixed to the hub 12 is a gear 14 which is driven by a pinion 15 keyed to the drive shaft 16.

Fixed in the outer end of the arm 13 is a pitch bearing 17 adapted to receive the root end 18 of the blade spar 19 for rotation therein. This pitch bearing 17 allows the blade to rotate about its longitudinal axis to change the pitch of the blade relative to the airstream. If it is desired to allow the blade to flap and drag as is common in articulated rotors, concentric universal joints may be inserted in the blade spars outboard of the pitch control arms.

To more clearly illustrate the invention, the blade is shown as made up of two sections namely, an outer portion 20 and an inner portion 21, although more are desirable and could be added without departing from the spirit and scope of this invention.

The inner portion 21 of the blade is fixed to a tube 22 through which the spar 19 extends. Suitable bearings (not shown) may be inserted between the tube 22 and the spar 19 to allow the tube 22 to rotate freely on the spar.

A thrust bearing 23 is fixed to the spar 19 to transmit the centrifugal load from the inner portion of the blade to the spar.

A crank arm 24 extends rearwardly from the spar to which it is rigidly attached. Fixed to and extending rearwardly from the tube 22 is a crank arm 25 similar in construction to the crank arm 24. These crank arms are provided with swivel joints intermediate their ends to permit the small amount of twisting naturally occurring from the manner in which they are used in our control system, as will appear hereinafter.

Pin jointed to the crank arms 24 and 25 are links 26 and 27. These links are provided with right and left handed screw ferrules so that their lengths may be adjusted. The lower ends of these links 26 and 27 are pivoted on pins 28 and 29, formed as a part of the rocking bar 30. Although it is not clearly indicated on the drawing, the type of pin joints employed in this linkage are those commonly used in the aircraft industry and being well known as universal type pin joints. It will be understood that when the blade consists of more than two sections, such blade sections will all be mounted for rotation about a common pitch axis, as by a telescoping shaft arrangement illustrated by spar 19 and tube 22 in Fig. 1, and that each of such blade sections will be operatively connected to the rocking bar 30 through a crank and link mechanism of the type just described.

A third pin 31 is located on the inner end of the bar 30. Connected to this pin 31 is a link 32 the other end of which is connected to the rotating portion 33 of the cyclic control ring generally indicated as 34.

The cyclic control ring is made up of an outer rotating member 33 and an inner non-rotating member 35. The member 35 is universally mounted on a ball member 36 formed on the shaft 11 so that it may be tilted for control purposes by a pilot control mechanism of conventional design.

Projecting from the hub of the inner member 35 of the cyclic control ring is a ball ended stud 37. A second ball ended stud 38 projects from the hub at 90° from the first stud 37. These studs are provided for connecting the cyclic control ring with a conventional control system (not shown) whereby the control ring may be rocked about the axes a—a and b—b as shown in Fig. 2 to provide directional control in a manner well known in the helicopter art.

Journaled on the shaft 11 for vertical movement is a collective pitch control ring 39. This member 39 is comprised of a rotating ring 40 and a non-rotating hub member 41. The hub has a groove 42 cut therein to receive the pin 43 fixed in the arm of the bell crank 44. The bell crank 44 swings about the fixed pivot 45 to lower and raise the hub member 41 which carries with it the rotating ring 40. The other arm of the bell crank 44 is connected to the pilot's collective pitch control lever (not shown).

Attached to the rotating ring 40 is a link member 46. The upper end of the link 46 is pivoted to the bar 30. Before describing the operation of this invention, a brief description will be given of the various flight conditions encountered by a helicopter and the type of blade best suited for these conditions.

*Autorotation.*—In autorotative condition, the flow of air is upward through the rotor except near the tips of the blade where due to the high tip speed of the blade, the flow approaches a zero velocity and then is reversed. When using the conventional type of blade and control system under this condition of flight, the blade is set at low positive angle relative to the rotative path of the blades. As this angle is the same throughout the span of the blade with present systems, it is apparent that the blade is not acting efficiently as the outer portion of the blade should have a positive angle of attack relative to the rotative path of the blade to provide greater lift in that portion of the disc area where the air flow is downward. Due the slower rotative velocity and higher inflow of the air, the inner portion must be set at a lesser angle than the tip. In the afore-mentioned condition, the best form of blade would be one where the inner portion would be at a negative angle and the outer portion at a low positive angle relative to the rotative path of the blades.

*High speed condition.*—In high speed flight, the air flow is downward throughout the disc area. However, due to the wide variation of the velocity between the inner and outer portions of the blade, it is possible to have the outer portion of the blade stalling when the inner section is working at too low an incidence to produce its share of lift when the conventional system is used wherein the blade angle is constant throughout the span. The best form of blade for high speed condition is one wherein the inner portion is at a higher angle of attack than the outer portion, said angles being spoken of as relative to the rotative path of the rotor.

For flight conditions between the two extremes mentioned above, a more neutral setting is required. To obtain these optimum positions of angle of attack for the inner and outer portions of the blade the aforedescribed mechanism is operated as follows:

For autorotative flight, the pilot moves the collective pitch lever so as to cause the bell crank 44 to move the collective pitch ring 39 upward. This in turn exerts an upward force on the bar 30 through the link 46. This upward force causes the bar 30 to swing on the pivot point 31. Links 26 and 27 move upward with the bar 30 and act to rotate the crank arms 24 and 25 thus causing the blade sections connected thereto to assume a lower angle of attack relative to the rotative path of the blade. As the link 27 is at a greater distance from the pivot point 31 than the link 26, it will cause the inner portion of the blade connected thereto to assume a lesser angle of attack than the outer blade section operated by the link 26. Thus, it will be seen that the blade will be operating in its most efficient form.

For high speed flight, the pilot causes the collective pitch control ring to be lowered. This will act to give the inner blade a higher positive angle than the outer blade through the same mechanism just described above thus obtaining an optimum setting of the blade portions for the condition of flight desired.

Intermediate settings of the blade angles may be obtained by moving the collective pitch control ring to a position between the aforedescribed conditions.

Cyclic control has heretofore been obtained by cyclicly varying the angle of attack of the whole blade. This method of control has the disadvantages of requiring high "stick" forces due to the inertia of the blades and causes unnecessary vibration.

The present invention avoids these disadvantages by providing a mechanism wherein it is only necessary to move the outer portion of the blade cyclicly, the setting of the inner portion of the blade being undisturbed by said action.

This operation is carried out in the following manner. The pilot tilts the cyclic control ring 34 by means of a conventional control system, not shown, connected to the ball ended studs 37 and 38 provided on the hub of the cyclic control ring. Let it be assumed that the stud 37 has been pulled down by the pilot control mechanism. This would exert an upward force on the link 32 connected to the control ring. As the link 32 moves upward, it would cause the bar 30 to swing upward about the pivot 29. The link 26 connected to the bar 30 will rock the crank arm 24 to cause the outer portion of the blade connected thereto to assume a lesser angle of attack while the inner portion remains undisturbed. As the blade moves around to the other side of the rotor, the blade will assume a greater angle of attack.

It can be seen by inspection of the drawing that the angular distance through which a particular blade section will be moved about its pitch axis by rotation of the rocking bar 30 about either of its end pivots 29, 31, will be dependent upon the distance between the point on the bar 30 to which that section is connected and the pivot about which the bar 30 is rotated. By connecting the cranks for the several blade sections to the rocking bar 30 in spaced relation, so that the crank corresponding to the outermost section is connected to the rocking bar at a point farther from the pivot 29 than any other of the crank connections, and so that the crank corresponding to the innermost section is substantially coaxial with the pivot 29, we provide means whereby actuation of the collective pitch control will rotate all of the airfoil blade sections in like direction about their common pitch axis through angles which decrease progressively as the distances increase between the respective sections and the root of the blade, and whereby actuation of the cyclic pitch control will rotate all but the innermost of the airfoil sections in like direction about their common pitch axis through angles which increase progressively as the distances increase between the respective sections and the blade root. The rocking bar 30 thus becomes a proportional motion transmitting means by which any effective control motion by the cyclic pitch and collective pitch control members is transmitted simultaneously to the respective blade sections to produce not only the proper rotation of such blade sections about their pitch axes to effectuate most efficiently the desired lift vector in the affected rotor blade, but also to introduce cyclic pitch changes in such blade sections to produce a component for horizontal translation of the helicopter.

While the preferred embodiment of the invention has been described in detail, it is to be understood that various changes may be made without departing from the scope of the invention as defined in the appended claims.

We claim:

1. In a helicopter rotor, a composite blade adapted to rotate about the axis of said rotor and comprising an inboard airfoil section and an outboard airfoil section, said sections being independently rotatable about a common axis extending longitudinally of said blade, a beam carried by said rotor for rotation about said rotor axis with said blade, cyclic pitch control means connected pivotally to said beam at a point adjacent one end thereof, collective pitch control means connected pivotally to said beam at a point adjacent the other end thereof, an articulated coupling connecting said inboard airfoil section to said beam at said second mentioned point, and an articulated coupling connecting said outboard airfoil section to said beam between said points.

2. In a helicopter rotor comprising a composite blade having an inboard airfoil section and an outboard airfoil section independently rotatable about a common axis extending longitudinally of said blade, cyclic pitch control means including a first ring rotatable about the axis of said rotor and tiltable in any direction with respect thereto, and collective pitch control means including a second ring rotatable about said rotor axis and movable longitudinally thereof, the improvement which comprises a beam carried by said rotor for rotation about said rotor axis with said blade, said beam being pivotally supported at a point adjacent one end by a link member connected to said first ring, said beam being pivotally supported at a point adjacent its other end by a link member connected to said second ring, whereby said beam may pivot about the said first mentioned point in response to movement of said second ring longitudinally of said rotor axis, and whereby said beam may pivot about the said second mentioned point in response to rotation of said first ring in a tilted plane about said rotor axis, an articulated coupling connecting said inboard airfoil section to said beam at said second mentioned point, and an articulated coupling connecting said outboard airfoil section to said beam between said points.

3. In a helicopter rotor, a composite blade comprising an inboard airfoil section and an outboard airfoil section, said sections being independently rotatable about a common axis extending longitudinally of said blade, collective pitch control means operatively connected to said airfoil sections for simultaneously rotating the latter through varying angles about said axis, cyclic pitch control means operatively connected to said airfoil sections for rotating only said outer section about said axis, said operative connections including a common transmitting means for proportionally transmitting motion from both of said pitch control means to said airfoil sections.

4. In a helicopter rotor, a composite blade comprising a plurality of airfoil sections disposed end to end longitudinally of said blade and independently rotatable about a common axis extending longitudinally of said blade, a floating beam, articulated couplings respectively connecting said sections to said beam at points along the beam in spaced relation to each other, collective pitch control means operatively connected to said beam adjacent one end thereof, and cyclic pitch control means operatively connected to said beam adjacent the other end thereof.

5. A helicopter rotor in accordance with claim 4 wherein the connection to said beam of the innermost of said sections substantially coincides with the connection to said beam of said collective pitch control means, the remainder of said articulated couplings being attached to said beam between the connections thereto for said collective pitch control means and said cyclic pitch control means.

6. In a helicopter rotor, a composite blade adapted to rotate about the axis of said rotor and comprising a plurality of airfoil sections disposed end to end longitudinally of said blade and independently rotatable about a common axis extending longitudinally of said blade, a beam carried by said rotor for rotation about said rotor axis with said blade, cyclic pitch control means connected pivotally to said beam at a point adjacent one end thereof, collective pitch control means connected pivotally to said beam at a point adjacent the other end thereof, and articulated couplings respectively connecting said airfoil sections to said beam in spaced relation along said beam, the articulated coupling corresponding to the innermost of said airfoil sections being connected to said beam at said second mentioned point, the remainder of said articulated couplings being connected to said beam between said points in such a way that the articulated coupling corresponding to any given one of said airfoil sections is connected to the beam farther from said second mentioned point than the connection to said beam of the articulated coupling corresponding to the adjacent inboard airfoil section, said beam being adapted in response to actuation of said collective pitch control means to turn about said first mentioned point and, in response to actuation of said cyclic pitch control means, to turn about said second mentioned point.

7. In a helicopter rotor, a composite blade adapted to rotate about the axis of said rotor and comprising a plurality of airfoil sections disposed end to end longitudinally of said blade and independently rotatable about a common axis extending longitudinally of said blade, a beam carried by said rotor for rotation about said rotor axis with said blade, cyclic pitch control means including a first ring rotatable about said rotor axis and tiltable in any direction with respect thereto, an articulated coupling connecting a point on said first ring with one end of said beam, whereby any longitudinal movement of said point with respect to said rotor axis resulting from rotation of said ring in a tilted plane about said rotor axis will be transmitted to said one end of said beam to cause said beam to pivot about the other end thereof, collective pitch control means including a second ring rotatable about said rotor axis and movable longitudinally thereof, an articulated coupling connecting said second ring with the other end of said beam, whereby any longitudinal movement of said ring with respect to said rotor axis will be transmitted to said other end of said beam to cause the beam to pivot about said one end thereof, said airfoil sections being fixed respectively to a corresponding number of concentric shafts, each of said shafts being rotatable with respect to the others to form a telescoping pitch axis for said blade, the inboard ends of said concentric shafts being exposed adjacent the root of said blade, said beam being disposed adjacent said blade root, the inboard ends of said shafts being individually connected through cranks pivotally to said beam in spaced relation, the crank corresponding to any airfoil section being connected to said beam closer to the said collective pitch control connection with said beam than the crank corresponding to the adjacent outboard airfoil section, the pivotal connection on said beam for the crank corresponding to the innermost of said sections being substantially coaxial with the pivot connection on said beam for said collective pitch control, whereby pivoting of said beam about either of said pitch control connections therewith will impart rotation to said shafts proportional to the distance between the respective crank connections on said beam and such pitch control connection acting as the stationary pivot.

8. In a helicopter rotor, a composite blade adapted to rotate about the axis of said rotor and comprising an inboard airfoil section and an outboard airfoil section, said sections being independently rotatable about a common axis extending longitudinally of said blade, a beam carried by said rotor for rotation about said rotor axis with said blade, cyclic pitch control means including a first ring rotatable about said rotor axis and tiltable in any direction with respect thereto, an articulated coupling connecting a point on said first ring with one end of said beam, whereby any longitudinal movement of said point with respect to said rotor axis resulting from rotation of said ring in a tilted plane about said rotor axis will be transmitted to said one end of said beam to cause said beam to pivot about the other end thereof, collective pitch control means including a second ring rotatable about said rotor axis and movable longitudinally thereof, an articulated coupling connecting said second ring with the said other end of said beam, whereby any longitudinal movement of said ring with respect to said rotor axis will be transmitted to said other end of said beam to cause the beam to pivot about said one end thereof, said airfoil sections being fixed respectively to concentric shafts, each of said shafts being rotatable with respect to the other to form a telescoping pitch axis for said blade, the inboard ends of said concentric shafts being exposed adjacent the root of said blade, said beam being disposed adjacent said blade root, the inboard ends of said shafts being individually connected through cranks pivotally to said beam, the crank corresponding to said outboard section being connected to said beam between the said pitch control connections with said beam, the pivotal connection on said beam for the crank corresponding to said inboard section being substantially coaxial with the pivot connection on said beam for said collective pitch control, whereby pivoting of said beam about either of said pitch control connections therewith will impart rotation to said shafts proportional to the distance between the respective crank connections on said beam and such pitch control connection acting as the stationary pivot.

EDWARD G. VANDERLIP.
ELLIOT DALAND.

REFERENCES CITED

The following references are of record in the file of this patent:

UNITED STATES PATENTS

| Number | Name | Date |
|---|---|---|
| 1,449,129 | Pescara | Mar. 20, 1923 |
| 1,454,944 | Pescara | May 15, 1923 |
| 1,986,709 | Breguet | Jan. 1, 1935 |
| 2,095,734 | Dornier | Oct. 12, 1937 |
| 2,162,794 | Asboth | June 20, 1939 |
| 2,308,802 | Barling | Jan. 19, 1943 |

FOREIGN PATENTS

| Number | Country | Date |
|---|---|---|
| 560,303 | France | July 5, 1923 |
| 851,766 | France | Oct. 9, 1939 |